United States Patent
Miyanaga

(10) Patent No.: US 6,966,730 B1
(45) Date of Patent: Nov. 22, 2005

(54) SHANK INSTALLATION STRUCTURE AND CUTTERS

(75) Inventor: Masaaki Miyanaga, Hyogo (JP)

(73) Assignee: Kabushiki Kaisha Miyanaga, Hyogo (JP)

( * ) Notice: Subject to any disclaimer, the term of this patent is extended or adjusted under 35 U.S.C. 154(b) by 381 days.

(21) Appl. No.: 10/110,701

(22) PCT Filed: Oct. 10, 2000

(86) PCT No.: PCT/JP00/07018

§ 371 (c)(1),
(2), (4) Date: Aug. 26, 2002

(87) PCT Pub. No.: WO01/28721

PCT Pub. Date: Apr. 26, 2001

(30) Foreign Application Priority Data

| Oct. 19, 1999 | (JP) | 11-297091 |
| Oct. 19, 1999 | (JP) | 11-297116 |
| Jun. 9, 2000 | (JP) | 2000-173959 |

(51) Int. Cl.$^7$ .......................................... B23B 51/04
(52) U.S. Cl. .................... 408/204; 408/240; 279/75; 279/155
(58) Field of Search ............... 408/204, 206, 408/207, 209, 703, 226, 239 A, 239 R, 240; 279/71, 74, 75, 155

(56) References Cited

U.S. PATENT DOCUMENTS

| 1,252,253 | A | * | 1/1918 | Dufresne | 279/74 |
| 2,906,541 | A | * | 9/1959 | Du Bois | 279/82 |
| 2,926,020 | A | * | 2/1960 | Dayton et al. | 279/75 |
| 2,990,188 | A | * | 6/1961 | Better et al. | 279/75 |
| 3,398,965 | A | * | 8/1968 | Cox | 279/30 |
| 3,583,715 | A | * | 6/1971 | Jahrl | 279/75 |
| 3,708,178 | A | * | 1/1973 | Lauricella | 279/81 |
| 4,309,042 | A | | 1/1982 | Hofle et al. | |
| 4,412,767 | A | | 11/1983 | Schmid et al. | |

(Continued)

FOREIGN PATENT DOCUMENTS

AU 718607 2/1998

(Continued)

OTHER PUBLICATIONS

Supplementary European Search Report for EPO Application No. EP00964748, The Hauge, dated Apr. 5, 2004.

*Primary Examiner*—Daniel W. Howell
(74) *Attorney, Agent, or Firm*—Marshall, Gerstein & Borun LLP

(57) ABSTRACT

A shank attaching structure with as less axial free movement as possible and of a simplified construction, a cutter for use with the shank attaching structure, and a cutter for use with the shank attaching structure which is free from an incident that the cutter becomes incapable of coming off even if an impactive rotating torque is exerted thereon, are intended to be provided, wherein the shank attaching structure is constructed such that in a state restricted by a restriction mechanism for restricting a depth to which a shank (7) is inserted into an arbor (A), the position of an engaging portion (7B) relative to the lock member (5) is axially deviated toward the open side of a shank attaching bore to bring the lock member (5) and the engaging portion (7B) into abutment with each other on the base end side of the shank attaching bore. The cutter (B) is constructed such that an outer peripheral edge portion (7C) of a concave portion forming the engaging portion (7B) is dented from an outer peripheral surface of the shank (7).

10 Claims, 16 Drawing Sheets

U.S. PATENT DOCUMENTS

| | | | |
|---|---|---|---|
| 4,577,875 A | | 3/1986 | Miyakawa |
| 4,708,548 A | | 11/1987 | Griffin et al. |
| 5,429,457 A | * | 7/1995 | Asano et al. ............... 408/204 |
| 5,934,846 A | * | 8/1999 | Ishii ........................... 408/141 |
| 6,250,856 B1 | * | 6/2001 | Miyanaga ................... 408/57 |
| 6,666,114 B1 | * | 12/2003 | Lin ............................. 81/438 |
| 2004/0026878 A1 | * | 2/2004 | Chen et al. ................... 279/75 |

FOREIGN PATENT DOCUMENTS

| | | |
|---|---|---|
| FR | 2 020 560 | 7/1970 |
| WO | WO-98/37999 A | 9/1998 |

* cited by examiner

SHANK INSTALLATION STRUCTURE AND CUTTERS

TECHNICAL FIELD

The present invention relates to a shank attaching structure capable of attaching a shank to an arbor on a drilling apparatus side with one touch, that is, quickly and easily, as well as to a cutter (meant by a broad concept including not only a cutter in a narrow sense but also a drill, and further including an adapter to be attached to a base end of a cutter) having a suitable shank for use with that shank attaching structure.

BACKGROUND ART

Heretofore, there has been a shank attaching structure of the so-called "screw-locking type" adapted to secure the shank of a cutter to an arbor attached at its base end to a rotating shaft of a drilling apparatus (an electric hand drill or a drilling machine) by side locking with a screw. At present, this screw-locking type shank attaching structure is most prevalent on a worldwide scale. Such a screw-locking type shank attaching structure, however, offers a low operability because it requires that the screw be loosened and fastened for detachment and attachment of cutters with use of a tool such as a hexagonal wrench at every change of the diameter of a hole to be drilled. In an attempt to solve such a problem, a shank attaching structure has been provided of a construction capable of detachably attaching a shank to an arbor wherein an attachment/detachment ring for attachment and detachment of the shank is provided which is operable (rotatable or slidable) to cause a lock member protruding into the shank attaching bore of the arbor to be retracted from the shank attaching bore thereby to release the locking between the lock member and an engaging portion provided at the outer periphery of the shank of a cutter (Japanese Patent Laid-Open Gazette No. HEI 10-537512).

Such shank attaching structures adapted to attach a shank to an arbor by operating this attachment/detachment ring include: those of the so-called "one-touch type" capable of attaching the shank to the arbor without requiring any operation of an worker on the attachment/detachment ring; and those of the so-called "two-touch type" adapted to attach the shank to the arbor by operating the attachment/detachment ring. Either type involves technical problems to be described below. First, in either case of the one-touch type shank attaching structure and the two-touch type shank attaching structure, the shank of a cutter axially freely moves within a very small dimension relative to the arbor due to dimensional tolerances (including machining tolerances, assembling tolerances and the like). Specifically, though the shank is positioned by causing the lock member on the arbor side to engage the engaging portion on the shank side at the time of attachment as described above, the shank of the cutter axially freely moves within a very small dimension relative to the arbor due to so-called "play" between the lock member and another portion of the arbor holding the lock member and "play" between the lock member and the engaging portion on the shank side. Accordingly, in the case where a drilling operation is performed using a drilling apparatus provided with a chip breaking mechanism which provides fluctuation in the axial direction to break chips into fragments, the aforementioned free movement of the shank offsets or considerably attenuate the chip breaking operation. For this reason, the chip breaking mechanism does not function effectively and hence cannot break strip-shaped chips produced during a cutting operation. It should be noted that the aforementioned chip breaking mechanism refers to a mechanism such as to vary or stop the feed of a cutter in the axial direction or reverse the feed direction at appropriate intervals thereby breaking strip-shaped chips produced by the cutting edge into fragments.

Secondly, the prior art one-touch type shank attaching structure is constructed so that a supporting member restraining the lock member from protruding into the shank attaching bore of the arbor is pressed from the base end of the arbor with a spring to position laterally of the lock member. The construction of this portion is intricate, which increases a parts count. Further, since the shank attaching structure needs to be assembled while positioning the supporting member urged to spring out of the shank attaching bore toward the opening thereof and the spring pressing against the supporting member, which are kept in their restrained states, such assemblage is complex and hence requires a skill.

Thirdly, in drilling a hole with a cutter attached to a one-touch or two-touch type shank attaching structure of this type, when a rotating torque, particularly an impactive rotating torque, is exerted during the drilling operation, the edge of the engaging portion of the shank is deformed to project radially outwardly by the lock member, thus resulting in such an inconvenience that the shank cannot be drawn out of the arbor due to lodging of this projecting portion. In such a case the drilling operation is interrupted for a long time, which incurs a great economic loss. Free movement of the shank relative to the arbor due to the aforementioned dimensional tolerances takes place also in the rotational direction (circumferential direction) of the shank. In such a case, particularly, the dimension of such a deformation is enlarged.

DISCLOSURE OF INVENTION

The present invention has been made in view of such present circumstances and intends to provide a shank attaching structure and a cutter having a suitable shank for use with that shank attaching structure, which have solved the aforementioned problems.

According to a first invention of the present invention solving the aforementioned problems, there is provided a shank attaching structure in which a lock member is disposed on an inner periphery of a shank attaching bore opening at a tip of an arbor so as to be radially outwardly retractable for removably fitting a shank provided at a base end of a cutter into the shank attaching bore of the arbor by an operation of an attachment/detachment ring, characterized in that:

a restriction mechanism is provided for restricting a depth to which the shank is inserted into the arbor; and in a state where the position of the shank relative to the arbor in an axial direction is restricted by the restriction mechanism, an engaging portion is located as axially deviated toward the open side of the shank attaching bore relative to the lock member.

According to a second invention of the present invention with a view to solving the aforementioned problems, there is provided a cutter to be attached to a shank attaching structure in which a lock member is disposed on an inner periphery of a shank attaching bore opening at a tip of an arbor so as to be radially outwardly retractable for removably fitting a shank provided at a base end of the cutter into the shank attaching bore of the arbor by an operation of an attachment/detachment ring, characterized in that:

the cutter has a restriction mechanism for restricting a depth to which the shank is inserted into the arbor; and in a state where the position of the shank of the cutter relative to the arbor in an axial direction is restricted by the restriction mechanism, an engaging portion formed at the shank is located as axially deviated toward a base end side of the shank attaching bore relative to the lock member.

In accordance with the shank attaching structure or the cutter thus constructed, in the state inwhich the axial position of the shank with respect to the arbor is restricted by the restriction mechanism, the lock member on the arbor side and the engaging portion of the shank relatively deviated toward the open side abut each other on the base end side of the shank attaching bore and, hence, it is possible to position the shank at a predetermined location relative to the arbor without any free movement of the shank in the axial direction. As a result, even when the chip breaking mechanism is actuated, free movement of the shank relative to the arbor in the axial direction can be prevented as much as possible, whereby effective chip breaking is possible during drilling as with the screw-locking shank attaching structure.

In the shank structure according to the first invention of the present invention or the cutter according to the second invention of the present invention, it is an optimal arrangement that the engaging portion is deviated in an amount (dimension) not less than a dimension within which the shank is freely moves axially relative to the arbor.

In the shank structure or the cutter, if the restriction mechanism is formed of an open end face of the arbor and an abutting surface of a step portion formed at the shank on the arbor side which abuts the open end face of the arbor, the two abutting surfaces are formed by work on the outward form side which is not boring work and, accordingly, such an arrangement is preferable in facilitating work and obtaining higher dimensional accuracy and allows the abutting state of the two abutting surfaces to be visually observed from the outside.

According to a third invention of the present invention with a view to solving the aforementioned problems, there is provided a shank attaching structure in which a lock member is disposed on an inner periphery of a shank attaching bore opening at a tip of an arbor so as to be radially outwardly retractable for removably fitting a shank provided at a base end of a cutter into the shank attaching bore of the arbor by an operation of an attachment/detachment ring, characterized in that:

in a state where the shank is fitted into and locked by the shank attaching bore of the arbor, the lock member is disposed to partially protrude radially outwardly and the protruding portion abuts a tapered surface formed on an inner periphery of the attachment/detachment ring to cause the lock member to be pressed toward the shank attaching bore side by a spring biasing the attachment/detachment ring in cooperation with a wedge action of the tapered surface.

With the shank attaching structure thus constructed, the lock member is constantly pressed radially inwardly by the spring force of the spring biasing the attachment/detachment ring with the shank in a state fitted into and locked by the shank attaching bore of the arbor, so that the lock member and the engaging portion of the shank intimately contact each other constantly, whereby it is possible to prevent the shank from freely moving in the axially direction and in the circumferential direction as much as possible. As a result, the third invention, together with the first and second inventions, is capable of preventing free movement of the shank in all directions as much as possible. For this reason, even when the chip breaking mechanism is actuated, free movement of the shank relative to the arbor in the axial direction can be prevented as much as possible, whereby effective chip breaking is possible during drilling as with the screw-locking type shank attaching structure. Further, it is possible to enhance the coupling of the cutter with the arbor and, as a result, it is possible to prevent the nose of the cutter from chattering and from chipping as well as to prolong the life of the nose.

In the shank attaching structure according to the third invention, if the taper angle of the tapered surface formed on the inner periphery of the attachment/detachment ring is as very low as about 2 degrees to about 5 degrees, it is possible to realize a construction which is capable of obtaining a highly effective wedge action, hence, reliably preventing free movement of the shank in the axial direction and in the circumferential direction.

Further, in the shank attaching structure according to the third invention, if the lock member is located at plural points equidistantly spaced from each other on the entire circumference of the arbor, while the engaging portion is located at plural points on the shank correspondingly to the lock member, the shank becomes a state evenly pressed from all around by the spring and, therefore, such an arrangement is a preferable arrangement that is capable of realizing stabilized attaching state with the shank in a centered state.

According to a fourth invention of the present invention with a view to solving the aforementioned problems, there is provided a shank attaching structure in which a lock member is disposed on an inner periphery of a shank attaching bore opening at a tip of an arbor so as to be radially outwardly retractable for removably fitting a shank provided at a base end of a cutter into the shank attaching bore of the arbor with one touch, characterized in that:

a supporting portion restraining the lock member from protruding into the shank attaching bore is constructed of a tip portion of a coil spring pressing the shank of the cutter toward the open side in which a wire is wound with adjacent turns thereof being made to lie closer to each other so that the winding pitch thereof is substantially equal to the diameter of the wire forming the coil spring.

With the shank attaching structure thus constructed, the coil spring for pressing the shank of the cutter toward the open side also serves as the bearing portion which is conventionally a separate member and, hence, the parts used become simple in configuration, while, at the same time, it is possible to reduce the number of parts, facilitate the assemblage of the structure, and improve the reliability. Further, the shank attaching structure can be supplied at a lower price.

In the shank attaching structure according to the fourth invention, if an inner peripheral surface of a base end portion of the shank attaching bore is formed with threadingly attaching means such as a groove for thread engagement with a base end of the coil spring, the coil spring can be threadingly attached thereto by simply bringing the base end of the coil spring into thread engagement with the threadingly attaching means and, hence, the shank attaching structure can be assembled easily with a lower parts count. Such an arrangement is excellent in that an worker who is not necessarily a skilled worker can assemble the structure easily and quickly.

In the shank attaching structure according to the fourth invention, if a base end of the coil spring is engaged with an engagement groove portion circumferentially contacting a base end portion of the shank attaching bore, the coil spring can be secured in the shank attaching bore by simply bringing the base end of the coil spring into engagement with the engagement groove at the base end portion of the shank attaching bore and, hence, the shank attaching structure can be assembled easily with a lower parts count. Such an arrangement is excellent in that an worker who is not necessarily a skilled worker can assemble the structure easily and quickly.

Further, in the shank attaching structure according to the fourth invention, if the wire forming the coil spring is quadrangular in section, such an arrangement is preferable because it is possible to reduce the spacing between adjacent turns of the wire in the tip portion of the coil spring as much as possible and because it is possible to make the outer periphery of the tip portion of the coil spring as smooth as possible. However, of course, the wire may be circular in section.

According to a fifth invention of the present invention with a view to solving the aforementioned problems, there is provided a cutter to be attached to a shank attaching structure in which a lock member is disposed on an inner periphery of a shank attaching bore opening at a tip of an arbor so as to be radially outwardly retractable for removably fitting a shank provided at a base end of a cutter into the shank attaching bore of the arbor with one touch, characterized in that:

a base end face of the shank of the cutter is configured to abut a lower end of a supporting portion constructed of a tip portion of a coil spring, the tip portion being formed of a wire wound with a winding pitch made substantially equal to the diameter of the wire forming the coil spring so as to allow the bearing portion to press the shank of the cutter toward the open side and restrain the lock member from protruding into the shank attaching bore.

The cutter thus constructed is capable of being fitted into the shank attaching structure according to the fourth invention.

According to a sixth invention of the present invention with a view to solving the aforementioned problems, there is provided a cutter for use with a shank attaching structure in which a lock member is disposed on an inner periphery of a shank attaching bore opening at a tip of an arbor so as to be radially outwardly retractable and a shank provided at a base end of the cutter is formed with a concave engaging portion for engagement with the lock member disposed on the arbor side so as to be capable of being removably fitted into the shank attaching bore of the arbor by an operation of an attachment/detachment ring, characterized in that:

a concave outer peripheral edge portion forming the engaging portion is dented from a neighboring peripheral surface of the shank.

With the cutter thus constructed according to the sixth invention, even if an impactive rotating torque is exerted on the engaging portion of the shank to deform the edge of the engaging portion radially outwardly, such a deformed portion does not project beyond the outer circumference of the shank because the concave outer peripheral edge portion is dented from the neighboring peripheral surface of the shank. Therefore, the cutter is free from an incident essential to the prior art that the shank becomes incapable of being drawn out of the arbor.

In the cutter according to the sixth invention, if the arrangement that the concave outer peripheral edge portion forming the engaging portion is dented from the neighboring peripheral surface of the shank is made by forming a chamfered portion at the outer peripheral edge portion, such an arrangement is a preferred embodiment for convenience of work because it allows easy work with a drill or the like.

Yet, in the cutter according to the sixth invention, if the arrangement that the concave outer peripheral edge portion forming the engaging portion is dented from the neighboring peripheral surface of the shank is made by decreasing the diameter of a portion of the shank where the engaging portion is formed, such an arrangement is a preferred embodiment for convenience of work because it can be easily made by shaft working with a lathe or the like.

Further, in the cutter according to the sixth invention, if the arrangement that the concave outer peripheral edge portion forming the engaging portion is dented from the neighboring peripheral surface of the shank may be made by cutting an outer peripheral surface of the shank in a portion where the engaging portion is located into a flat surface.

Yet further, in the cutter according to the sixth invention, if the engaging portion is a conical concave portion, such an arrangement is a preferred embodiment for convenience of work because it can be easily worked with a drill or the like.

In each of the foregoing cutters, if the shank of the cutter is core-shaped, while the engaging portion is formed by press work, it is possible to realize a cutter which is suitable for working of veneers, thin metal sheets or the like and for volume production and which can be supplied at a low price.

Further, in the aforementioned cutter, if the engaging portion is formed of a portion of a spherical surface and has a depth that is 0.4 to 1 times as large as the radius of a spherical surface of a spherical body forming the lock member, such an arrangement is a preferred embodiment because the lock member can be reliably locked.

BRIEF DESCRIPTION OF DRAWINGS

FIG. 7(*b*) is a view showing the construction of the arbor body into which the coil spring shown in FIG. 7(*a*) is to be fitted, the right-hand side of the arbor body from the center line being shown in section.

FIG. 8(*b*) is a bottom plan view of the coil spring shown in FIG. 8(*a*).

FIG. 14(*b*) is a fragmentary sectional view taken on line b—b as viewed in the direction indicated by arrow in FIG. 14(*a*).

FIG. 15(*b*) is a fragmentary sectional view taken on line b—b as viewed in the direction indicated by arrow in FIG. 15(*a*).

FIG. 16(*b*) is a fragmentary sectional view taken on line b—b as viewed in the direction indicated by arrow in FIG. 16(*a*).

BEST MODE FOR CARRYING OUT THE INVENTION

Hereinafter, a shank attaching structure and a cutter having a shank for use with the attaching structure according to an embodiment of the present invention will be described specifically with reference to the drawings. However, the present invention is not limited to this embodiment.

Figure 1:
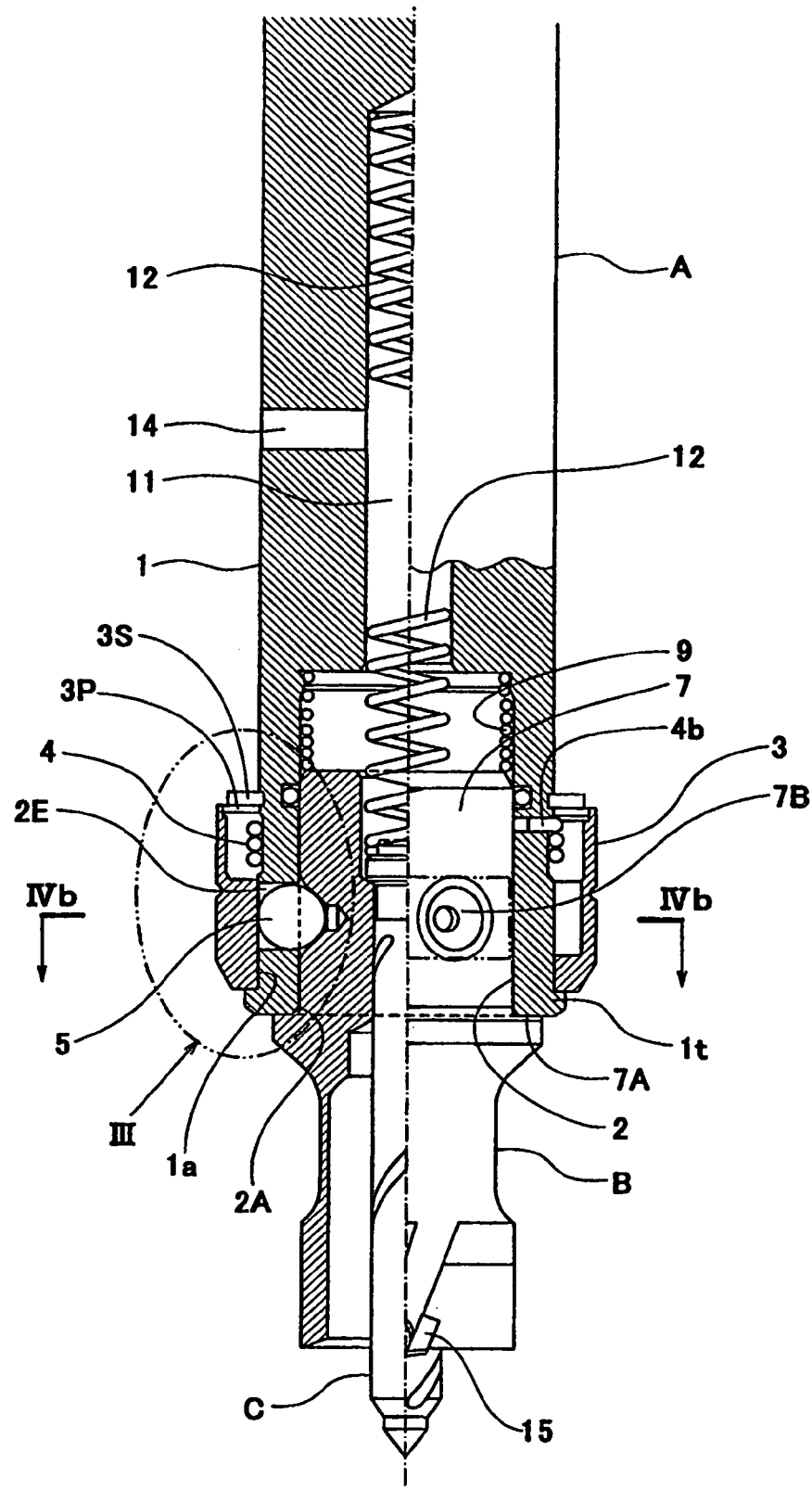
FIG. 1 is a view showing the overall construction of a shank attaching structure according to an embodiment of the present invention, opposite sides of the structure with respect to a center line being shown in different sections.
Figure 2:
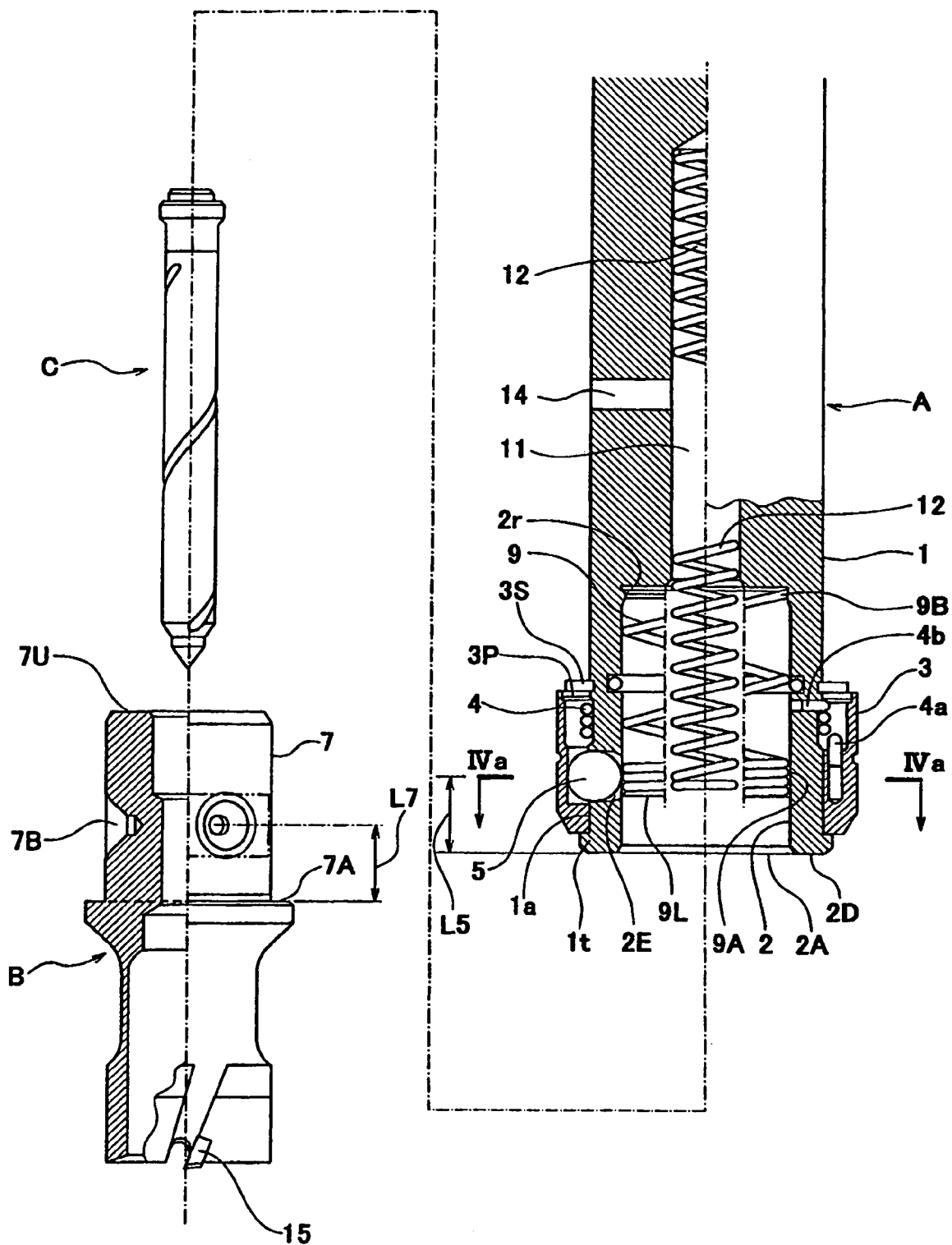
FIG. 2 is a view, partially in section, of the overall structure in a state where the shank of a cutter is drawn out of an arbor with a center pin drawn out of the cutter.

In FIGS. 1 and 2 showing this embodiment, A designates an arbor secured to the drilling apparatus side, B designates a cutter having a base end provided with a shank 7 to be attached to and detached from the arbor A and a tip provided with a cutting edge 15, C designates a center pin for positioning the cutter B at the time of drilling, serving as an on-off valve for the supply of a coolant, and discharging core-shaped cut-out chips from the inside of the cutter.

As shown in FIG. 1 or 2, the arbor A has an opening 2A of a shank attaching bore 2 at a tip (the lower end in FIGS. 1 and 2) of an arbor body 1. On an outer peripheral portion of the arbor body 1 adjacent the base end of the opening 2A is disposed an attachment/detachment ring 3 so that the ring 3 rotates circumferentially on an outer peripheral surface 1*a* of the arbor body 1.

Figure 3:
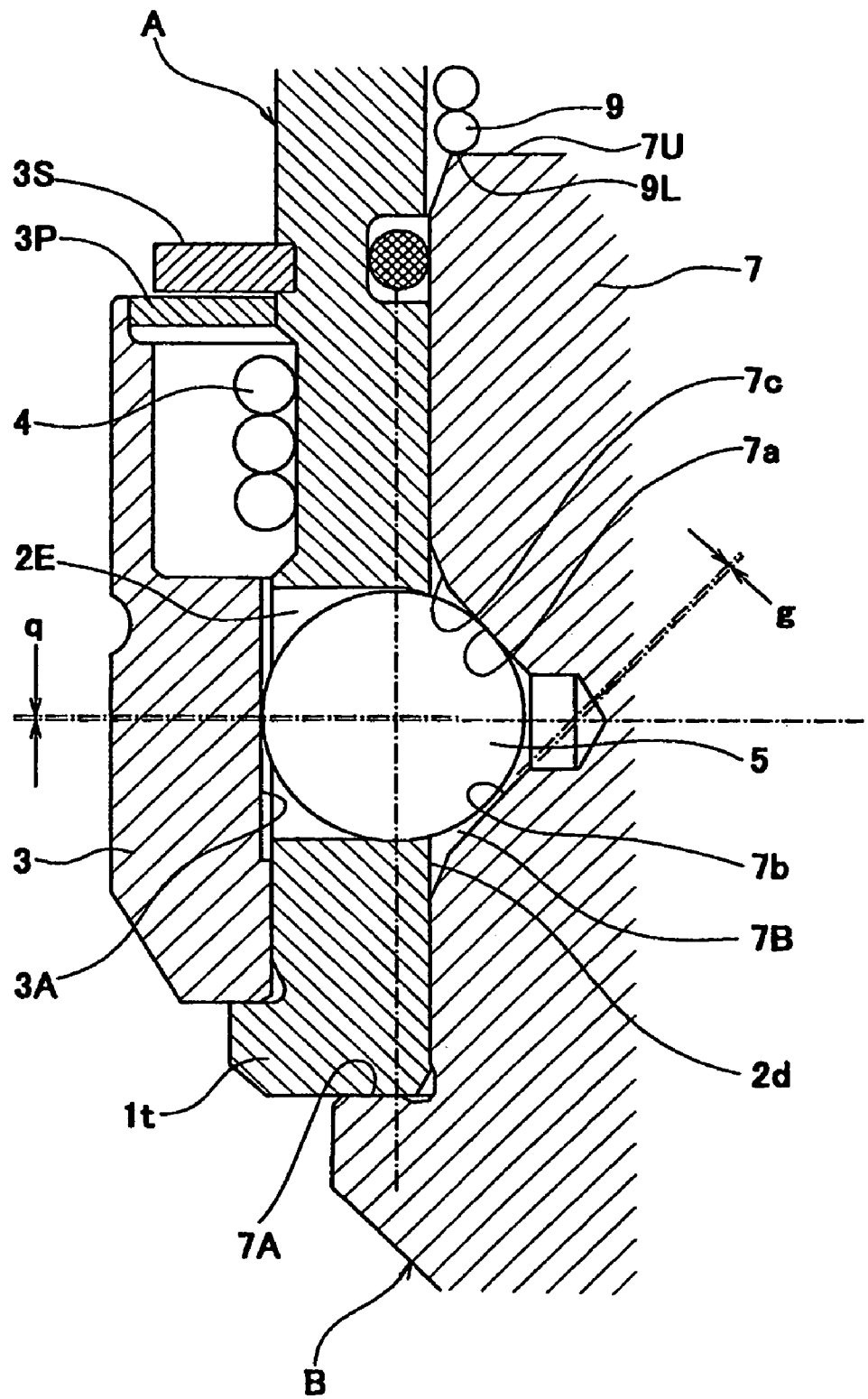
FIG. 3 is an enlarged sectional view showing a portion III encircled with long dashed double-short dashed line in FIG. 1.
Figure 4A:
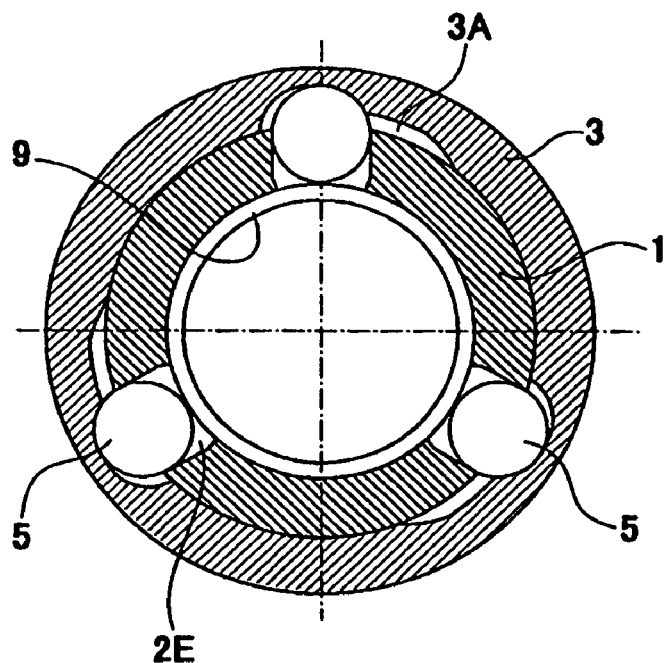
FIG. 4(a) is a cross-sectional view taken on line IVa—Iva as viewed in the direction indicated by arrow in FIG. 2.
Figure 8A:
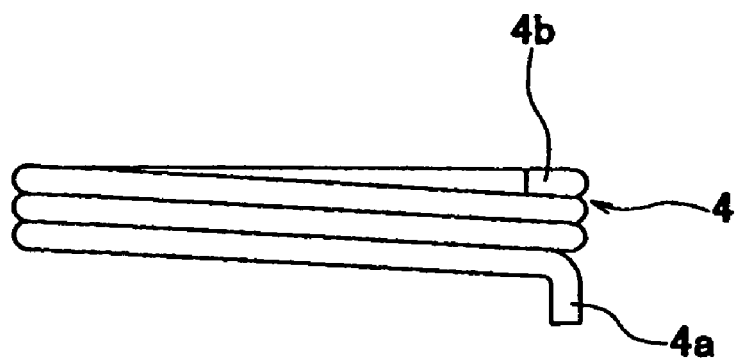
FIG. 8(*a*) is a side elevational view showing the construction of a coil spring biasing the attachment/detachment ring shown in FIGS. 1 and 2.
Figure 8B:
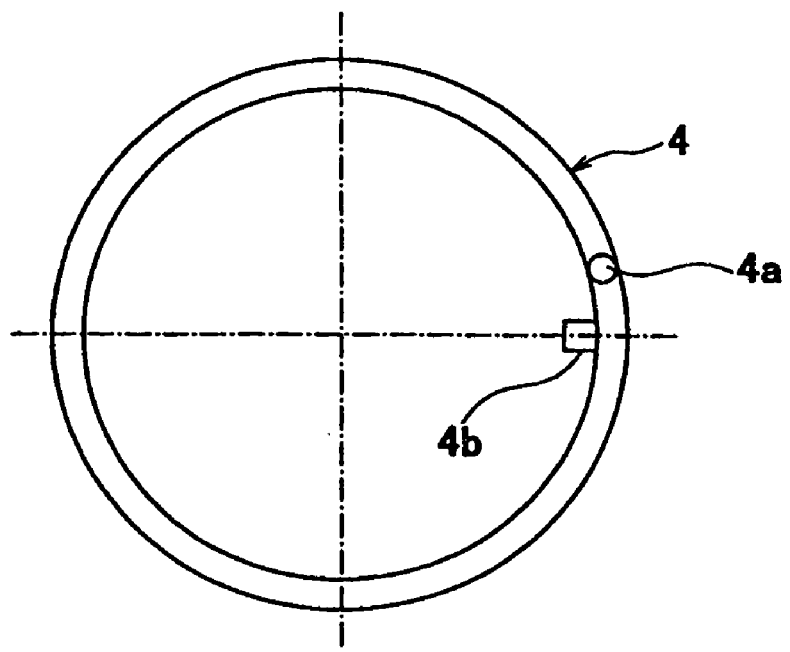

In this embodiment, the attachment/detachment ring 3 is biased by a coil spring 4 such as shown in FIGS. 8(*a*) and 8(*b*) in one circumferential direction, namely, clockwise when viewed from the opening 2A side (see FIG. 1) in this embodiment (counterclockwise in FIG. 4, see the direction indicated by arrow K). As shown in FIGS. 2 and 3, the coil spring 4 is disposed between the arbor body 1 and the attachment/detachment ring 3. The coil spring 4 has one end 4*a* (see FIG. 8) engaged with the attachment/detachment ring 3 and an opposite end 4*b* (see FIG. 8) engaged with the arbor body 1 (see FIG. 2).

With respect to the operating direction of the attachment/detachment ring, the ring may be configured to be movable not circumferentially but axially.

Figure 6A:
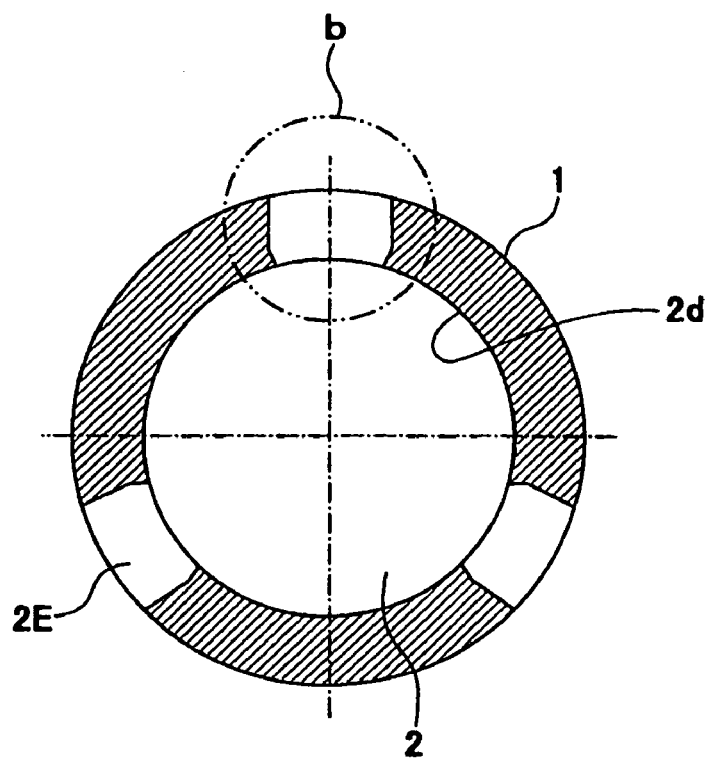
FIG. 6(a) is a sectional view, in a section extending through a through-hole center, of through-holes defined at a tip portion of an arbor body for receiving the lock member.
Figure 6B:
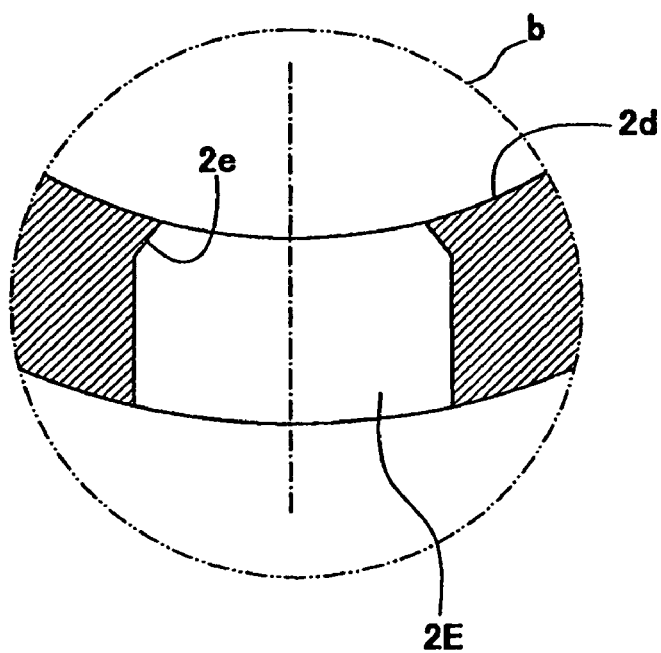
FIG. 6(b) is an enlarged sectional view of a receiving hole shown in FIG. 6(a).

As shown in FIGS. 4 and 6(*a*), a portion of the arbor body 1 around which the attachment/detachment ring 3 is located defines through-holes 2E radially extending through that portion for receiving metal (or other material such as ceramic) spherical bodies (balls) 5 (see FIG. 4) serving as lock members at three points equidistantly spaced from each other circumferentially of the arbor body 1. In this embodiment, each through-hole 2E has a radially inner edge portion formed with an annular (or a shape formed of spaced segments of an annulus) projection 2*e* to prevent each spherical body 5 from coming off radially inwardly of the arbor body 1, as shown in the enlarged view at FIG. 6(*b*). Stated otherwise, each spherical body 5 is disposed so as to be retractable from a state where the spherical body 5 partially protrudes from an inner peripheral surface 2*d* of the shank attaching bore 2 of the arbor body 1 (see FIG. 1) to a radially outwardly retracted state (see FIG. 2).

Figure 5A:
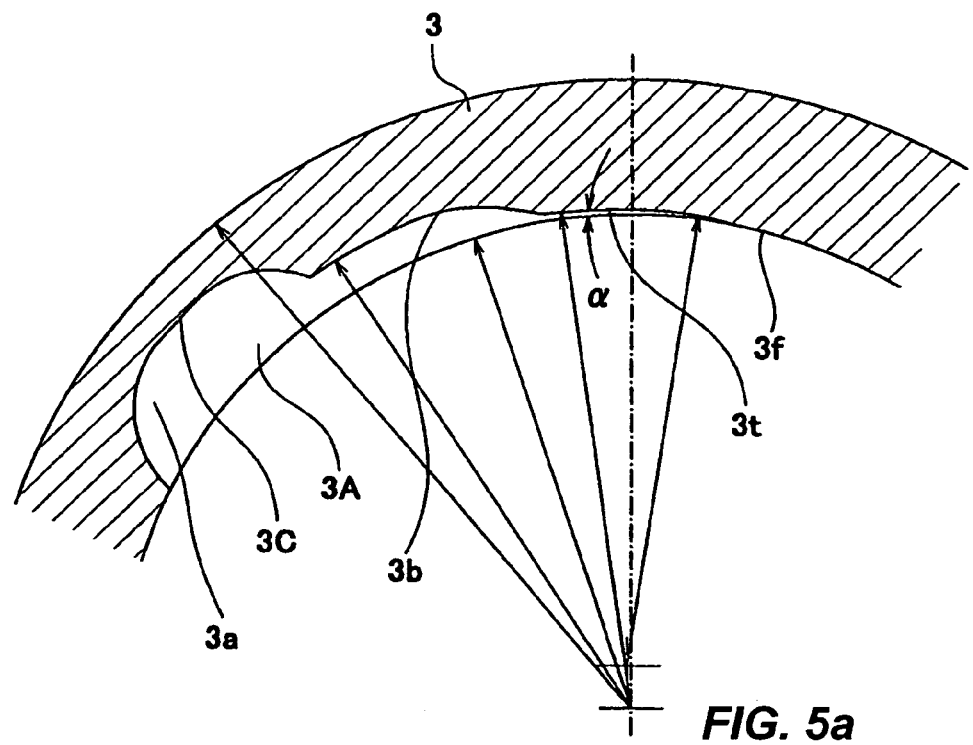
FIG. 5(a) is an enlarged fragmentary sectional view showing the shape of a cam surface operating a lock member of an attachment/detachment ring shown in FIG. 4(a)

As shown in the enlarged view at FIG. 3, the attachment/detachment ring 3 shown in FIGS. 1 and 2 has an inner periphery formed with a concave portion 3A abutting the outer periphery of each spherical body 5 to press the spherical body 5 radially inwardly. When this concave portion 3A is viewed in horizontal section (cross section), it comprises a cam surface (pressing surface) 3C of the configuration shown in the enlarged view at FIG. 5(*a*). Specifically, the cam surface 3C comprises a C-shaped receiving portion 3*a* for holding each spherical body 5 in a state where the spherical body 5 is completely retracted outwardly from the inner peripheral surface 2*d* of the shank attaching bore 2 of the arbor body 1, namely, a state where the spherical body 5 does not protrude inwardly from the inner peripheral surface 2*d* of the shank attaching bore 2, a tapered surface 3*t* having an end continuous with an inner peripheral surface 3*f* of the concave portion 3A of the attachment/detachment ring 3 and tapered at a very small taper angle (specifically a taper angle of about 2 to about 5 degrees in this embodiment) to perform a "wedge action" pressing the spherical body 5 inwardly, and a connection surface 3*b* connecting the tapered surface 3*t* to the C-shaped portion 3*a*. By virtue of the cam surface 3C, the spherical body 5 in each through-hole 2E is capable of operating to assume the state outwardly retracted from the inner periphery of the shank attaching bore 2 and the state partially protruding from the inner periphery of the shank attaching bore 2. The aforementioned "taper angle" refers to an angle á which the tapered surface 3*t* forms with a reference circle (see FIG. 5(*a*)).

Figure 5B:
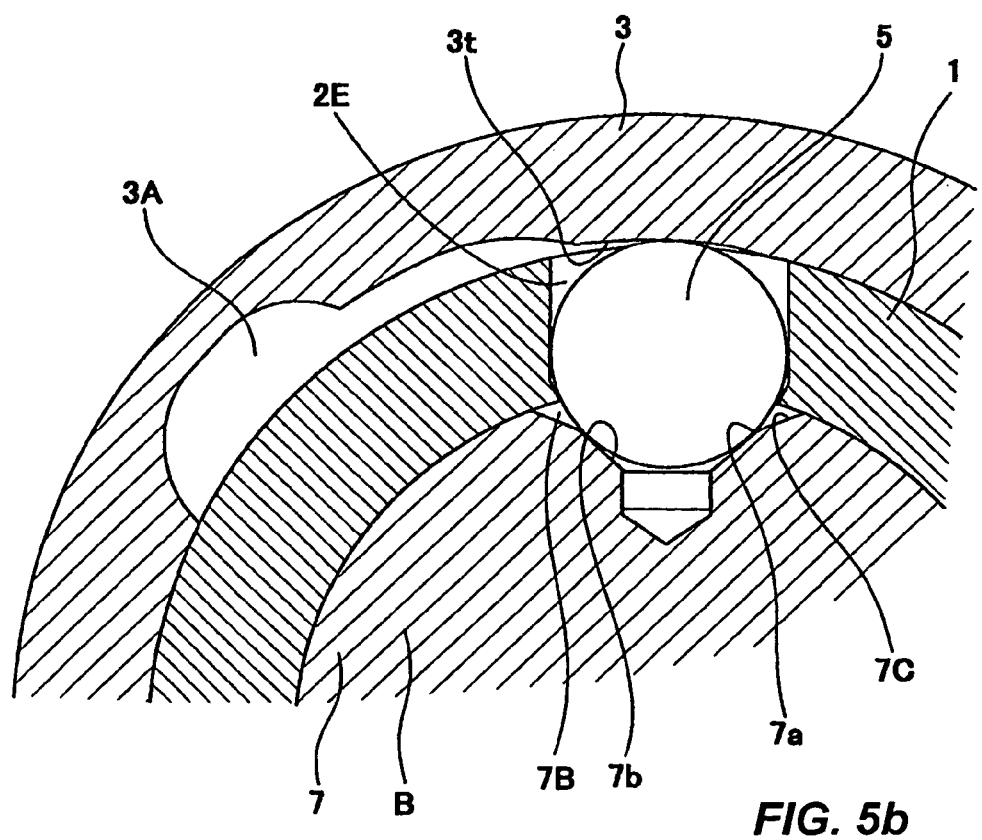
FIG. 5(b) is an enlarged fragmentary sectional view showing a portion Vb encircled with long dashed double-short dashed line in FIG. 4(b) for illustrating a state of the lock member pressed inwardly of a shank attaching bore by the cam surface shown in FIG. 5(a).

The portion around which the attachment/detachment ring 3 is disposed at the tip portion of the arbor body 1 is made dimensionally smaller (thinner) than the diameter of each spherical body 5 in the thicknesswise (thickness in the radial direction) direction. As shown in FIG. 5(b), the tapered surface 3t constantly acts to inwardly press each spherical body 5 in a state contacting a concave engaging portion 7B formed at the shank 7 of the cutter B. This pressing operation is caused by the coil spring 4 biasing the attachment/detachment ring 5 counterclockwise in FIG. 5. At a base end (the upper end in FIGS. 1 to 3) of the attachment/detachment ring 3 are disposed a plate-shaped cap member 3P for preventing entry of dust and a locking snap ring 3S located above the cap member 3P to fix the attachment/detachment ring 3 and the cap member 3P at their respective locations as positioned axially. The lower end of the attachment/detachment ring 3 is engaged by a collar portion 1t formed at the lower end of the arbor body 1.

As shown in FIG. 2, between the shank 7 of the cutter B to be fitted into the shank attaching bore 2 of the arbor A and a portion located below the shank 7 is formed a step portion 7A having a smaller diameter on the shank side 7. On the base end side of the step portion 7A, the shank 7 is formed with the engaging portion 7B for locking each spherical body 5. The engaging portion 7B comprises a conical (tapering dish-shaped) concave portion. The step portion 7A abuts a tip face (open end face) 2D of the arbor A to restrict further insertion of the cutter B into the shank attaching bore 2. Dimension L7 from the step portion 7A to the center of the engaging portion 7B is slightly smaller than dimension L5 from the tip face 2D of the arbor A to the center of each spherical body 5; specifically, this arrangement provides a deviation toward the dimensional tolerance decreasing side. This means that the provision of a decrease by a length q (q=L5−L7) makes the positional relation between the relevant components deviate (deviated dimension q) so as to provide a dimensional relation such that each spherical body 5 abuts the tapered surface 7a located closer to the base end side than the center of the tapering dish-shaped engaging portion 7B while failing to abut (with a clearance g) the tapered surface 7b located closer to the tip side than the center of the tapering dish-shaped engaging portion 7B.

Figure 7A:
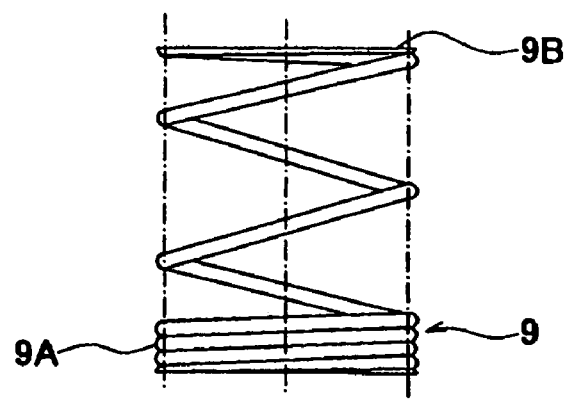
FIG. 7(*a*) is a view showing the construction of a coil spring to be fitted into the shank attaching bore shown in FIG. 1.
Figure 7B:
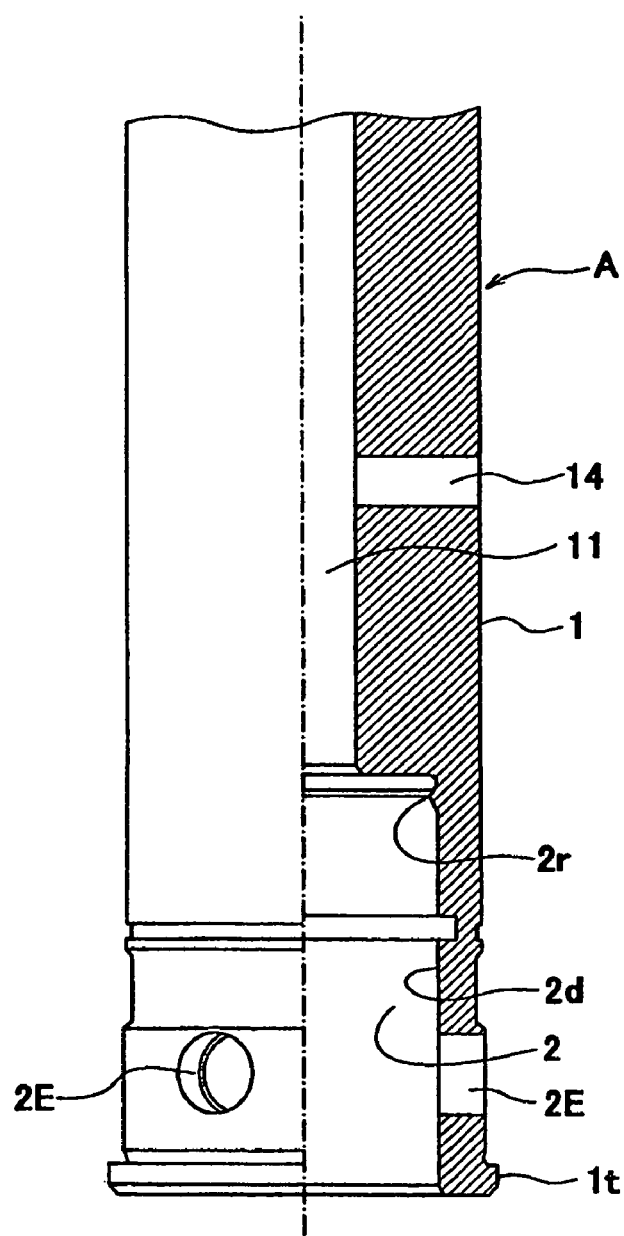

As shown in FIG. 7(b), at the base end portion of the shank attaching bore 2 of the arbor A is formed threadingly attaching means, that is, an annular convex portion 2r having a smaller diameter than the inner diameter of the shank attaching bore 2, to which a base end portion 9B of a coil spring 9 shown in FIG. 7(a) is attached threadingly (or engagingly). In this embodiment, the coil spring 9 is sized so as to be accommodated in the shank attaching bore 2 with its outer periphery in sliding contact with the inner periphery of the shank attaching bore 2 (accurately speaking, with a slight clearance therebetween) as shown in FIGS. 1 and 2.

The coil spring 9 functions to bias the cutter B fitted in the shank attaching bore 2 in such a direction as to detach the cutter B by its spring force. As shown in FIGS. 2 and 7(a), a tip portion 9A of the coil spring 9 is constructed so that the winding pitch of the coil is made substantially equal to the diameter of the wire forming the coil spring; namely, it is constructed so that adjacent turns of the wire lie closer to each other. The tip portion 9A in which turns of the wire are densely provided presses each spherical body 5 radially outwardly in the state in which the cutter B is not attached to the shank attaching bore 2 (see FIG. 2), thereby preventing the spherical body 5 from protruding toward the shank attaching bore side 2. Though this embodiment uses a wire having a circular section as the wire forming the coil spring 9, it is possible to use a wire having a quadrangular section. Such an arrangement is preferable in that adjacent turns of the wire can make the outer peripheral surface of the coil spring substantially flat.

As shown in the enlarged view at FIG. 3, base end face (the upper end face in FIG. 1) 7U of the cutter B is configured to abut tip face (the lower end face in FIG. 1) 9L of the coil spring 9.

As shown in FIGS. 1, 2 and 7(b), at the center of the shank attaching bore 2 is formed a bottomed hole 11 coaxially with the shank attaching bore 2 to receive a coil spring 12 for pressing the center pin C toward the tip. This bottomed hole 11 also serves as a part of a path for supplying a coolant to a cutting portion at the tip of the cutter and communicates with a radially extending coolant supply path 14 to enable the supply of the coolant toward the tip of the cutter from a ring (not shown, refer to ring 16 in FIG. 9) on the fixed side supporting the arbor body 1 for rotation.

As shown in FIG. 3, the tapering dish-shaped concave portion forming the engaging portion 7B of the cutter B has an outer edge portion 7c which is dented from the outer periphery of the shank 7; specifically, the outer edge portion 7c is chamfered as shown in FIG. 3 for example. This means that in this embodiment the outer edge portion 7c of the engaging portion 7B is formed at a lower angle (more obtuse) than the taper angle of the surface extending from the center. However, instead of chamfering, it is possible to make smaller the diameter of the portion of the shank 7 where the engaging portion 7B is located than the diameter of other portion of the shank 7, as indicated with long dashed double-short dashed line in FIGS. 1 and 2. Alternatively, though not shown, it is possible to cut an outer peripheral surface of the shank 7 in the portion where the engaging portion 7B is located into a flat surface.

Figure 4B:
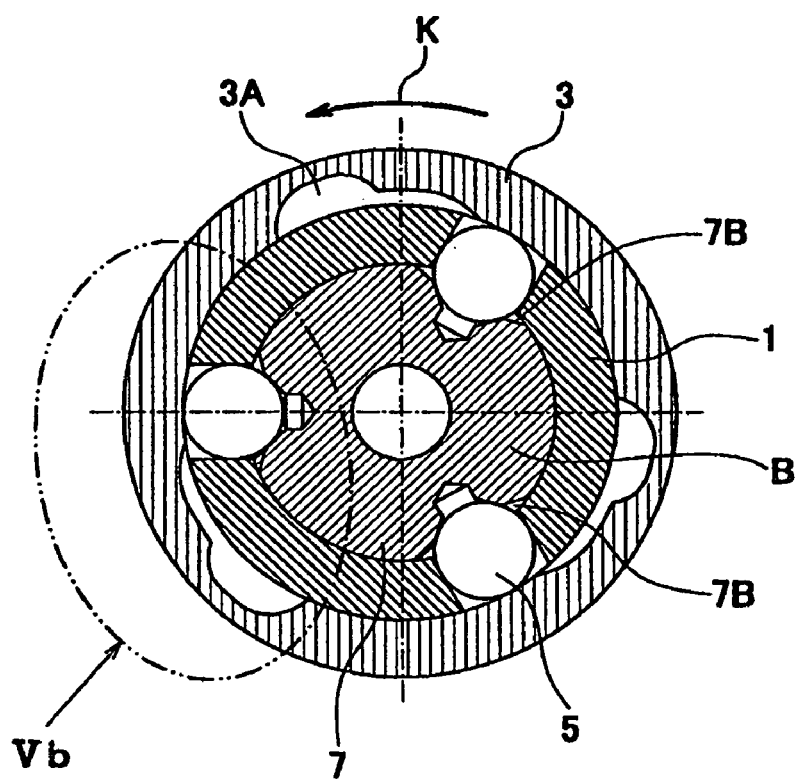
FIG. 4(b) is a cross-sectional view taken on line IVb—Ivb as viewed in the direction indicated by arrow in FIG. 1.

In this embodiment, the engaging portions 7B of the cutter B are placed on the outer periphery of the shank 7 at three points circumferentially equally distributed correspondingly to the spherical bodies 5, as shown in FIG. 4(b).

Though the spherical bodies 5 as well as the engaging portions 7B may be placed at two, four or five points or more, an arrangement having three or more points at which they are placed is preferable in firmly engaging the shank 7 centrally of the bore 2.

The shank attaching structure thus constructed and the cutter having the shank for use with the shank attaching structure provide the following effects. That is, in fitting the cutter B into the shank attaching bore 2 of the arbor A, it is sufficient to simply insert the shank portion 7 into the shank attaching bore 2 of the arbor A until the step portion 7A of the cutter B abuts the tip face (open end face) 2D of the arbor with a hand gripping a lower portion of the cutter B than the shank 7. Stated otherwise, it is possible to fit the cutter B into the arbor A by simply inserting it with one hand and with one touch.

The insertion of the shank 7 causes the lower end face 9L of the coil spring 9 to abut the base end face 7U of the shank 7, hence, to be pressed upward, with the result that each spherical body 5, which has been restrained by the outer peripheral surface of the tip portion 9A of the coil spring 9, partially protrudes into the shank attaching bore 2 of the arbor body 1 and engages a respective one of the engaging portions 7B formed at the shank 7 of the cutter B (see FIG. 5(b)). At this time, in some cases it is required that the cutter B be circumferentially rotated through an appropriate angle relative to the arbor A to achieve circumferential positioning between the spherical body 5 and the engaging portion 7B. When the spherical body 5 partially protrudes into the shank attaching bore 2 as described above, the attachment/detachment ring 3, which has so far been acting against the biasing force of the coil spring 4 with the help of the spherical body 5 as shown in FIG. 4(*a*), is rotated by the biasing force of the coil spring 4 to assume the state shown in FIG. 4(*b*). In this state, each spherical body 5 is pressed inwardly from the outside with a strong force resulting from doubling of the spring force of the coil spring 4 by the "wedge action" of the tapered surface 3*t* having a very small taper angle formed at the attachment/detachment ring 3. Accordingly, even if there is some play in the radial direction, the "wedge action" allows the cutter B to be held without rattling.

In the state where the spherical bodies 5 engage respective engaging portions 7B as described above, the cutter B cannot freely move axially because of that engagement together with the axial positioning between the step portion 7A of the cutter B and the tip face (open end face) 2D of the arbor, which form the restriction mechanism. Specifically, in the state where the step portion 7A of the cutter B abuts the tip face (open end face) 2D of the arbor and hence cannot be inserted further, each spherical body 5 rigidly abuts the surface 7*a* of a corresponding engaging portion 7B on the base end side and defines clearance g with the surface 7*b* on the tip side, whereby the cutter B is in a state completely incapable of freely moving relative to the arbor A.

Accordingly, in drilling a metal or the like with the cutter B thus fitted in the arbor A, even if the arbor A is axially moved with appropriate timing due to actuation of the chip breaking mechanism, the cutter B moves in a state firmly and intimately fitted to the arbor A axially and circumferentially, thus allowing a desired chip breaking action to be performed.

Even if an impactive force acts in the rotational direction for some reason to deform a portion of the engaging portion 7B in abutment with the spherical body 5 during such a drilling operation, such a deformed portion does not project radially outwardly beyond the outer periphery of the shank of the cutter B because the outer edge portion of the engaging portion 7B is chamfered (or because the diameter of the shank is made smaller). For this reason, when the cutter B is to be detached from the arbor A, the shank attaching structure of the present invention is free from such an incident that the cutter B becomes incapable of being detached from the arbor A as in the prior art. Stated otherwise, by simply rotating the attachment/detachment ring 3 against the biasing force of the coil spring 4, it is possible to remove the cutter B from the shank attaching bore 2 of the arbor A. Also, the aforementioned deformation can be reduced effectively because the aforementioned "wedge action" eliminates play in the radial direction so that any impactive external force does not work.

Because the shank attaching structure according to this embodiment is constructed such that the tip portion of the coil spring 9 where adjacent turns of wire lie closer to each other restrains each spherical body 5 from protruding radially inwardly as described above and because the coil spring 9 is constructed so as to be fitted into the shank attaching bore 2 by simply threadingly attaching it to (or engaging it with) the annular convex portion 2*r* on the base end side of the shank attaching bore 2, it is possible to make the construction very simple, to lower the numbers of parts, and to allow an worker, who is not necessarily a skilled worker, to assemble the structure easily and quickly, with the result that the structure can be supplied at a lower price.

Figure 9:
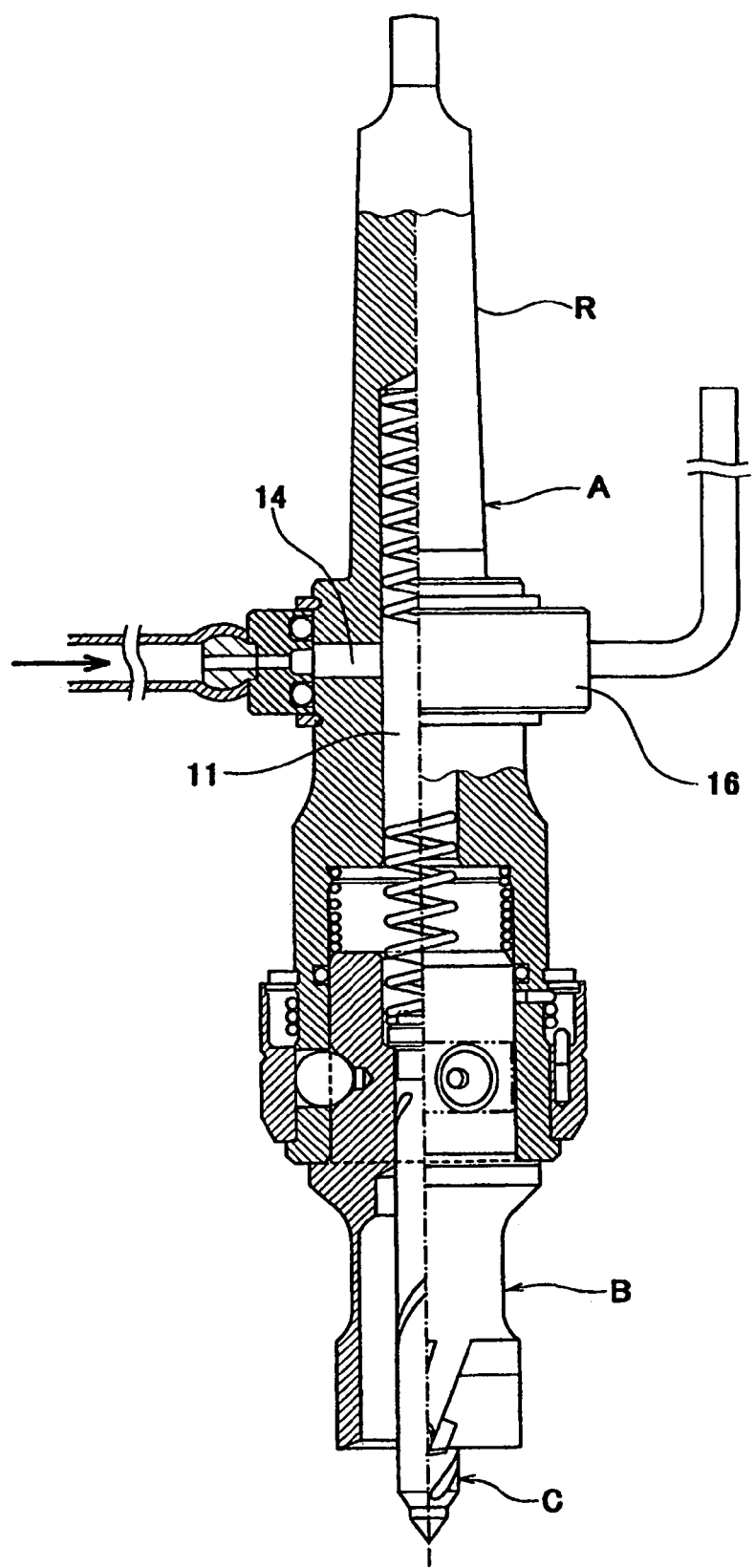
FIG. 9 is a view showing the overall construction of a shank attaching structure according to another embodiment of the present invention which is different from the embodiment shown in FIGS. 1 to 7 in that a fitting portion to be fitted to the rotating shaft side on the drilling apparatus side is of a "Morse taper" configuration, opposite sides of the structure with respect to a center line being shown in different sections.

It is needless to say that, instead of the embodiment shown in FIGS. 1 and 2, an embodiment is possible such that a fitting portion R of the arbor to be attached to the rotating shaft on the drilling apparatus side may be of a so-called "Morse taper" configuration as shown in FIG. 9. Referring to parts that are shown not in FIGS. 1 and 2 but in FIG. 9, reference numeral 16 in FIG. 9 designates a ring supporting the arbor body 1 for rotation, from which a coolant is supplied to the bottomed hole 11 coaxially arranged with the shank attaching bore 2 through a radially extending coolant supply path 14, with the result that the supply of the coolant to the cutting portion at the tip of the cutter B can be achieved.

Meanwhile, the shank attaching structure shown in FIGS. 1 to 9 and the cutter to be attached thereto are for use in heavy cutting such as cutting of a relatively thick metal plate and the like, whereas another embodiment according to the fourth to sixth inventions of the present invention is different from the foregoing embodiment in that it includes a shank attaching structure and a cutter to be attached thereto, which are for use in light cutting and adapted to drill a veneer, a thin metal sheet or the like. The following description is made of this shank attaching structure and the cutter to be attached thereto. Since parts or arrangements in FIGS. 10 to 16 corresponding to those shown in FIGS. 1 to 9 are designated by respective reference numerals, each being the sum of 100 and a reference numeral used to designate a like part in FIGS. 1 to 9, refer to such parts or arrangements. Specifically, arbor A is basically of the same construction as the embodiment shown in FIGS. 1 to 9 as far as the fourth to sixth inventions of the present invention are concerned. On the other hand, cutter B in this embodiment is manufactured by subjecting a plate material as thin as about 1 to about 2 mm to forming work (such as press work) and has a shank 107 at an upper end portion of the cutter B, the shank 107 being circumferentially formed with engaging portions 107B at three points equidistantly spaced from each other for engagement with and correspondingly to respective metal spherical bodies 105 disposed at the arbor A as lock members. These engaging portions 107B are each formed to have a concave configuration consisting of a portion of a spherical surface by press working. In this embodiment, the curvature of the concave portion of each engaging portion 107B is substantially equal to that of each spherical body 105, and the depth of the concave portion of the engaging portion 107B is about 0.5 to about 0.6 times as large as the aforementioned spherical surface though it may be within the range of from about 0.4 to about 1.0 times as large as the spherical surface. Since the engaging portion 107B is formed by press work as described above, the engaging portion 107B has a peripheral edge portion 107*c* in a state (or a shape) chamfered round relative to the outer periphery of the shank 107. The number of the points at which the aforementioned engaging portions 107B are located and that of the points at which the spherical bodies 105 of the arbor A as lock members are located are not limited to three on respective periphery but may be four, five or more.

A step portion 107A, formed between the shank 107 and the portion situated lower than the shank 107, is largely chamfered round in this embodiment, and correspondingly thereto, an open end 102D of the shank attaching bore 102 of the arbor A is also chamfered round to restrict an insertion depth of the shank into the arbor.

Figure 10:
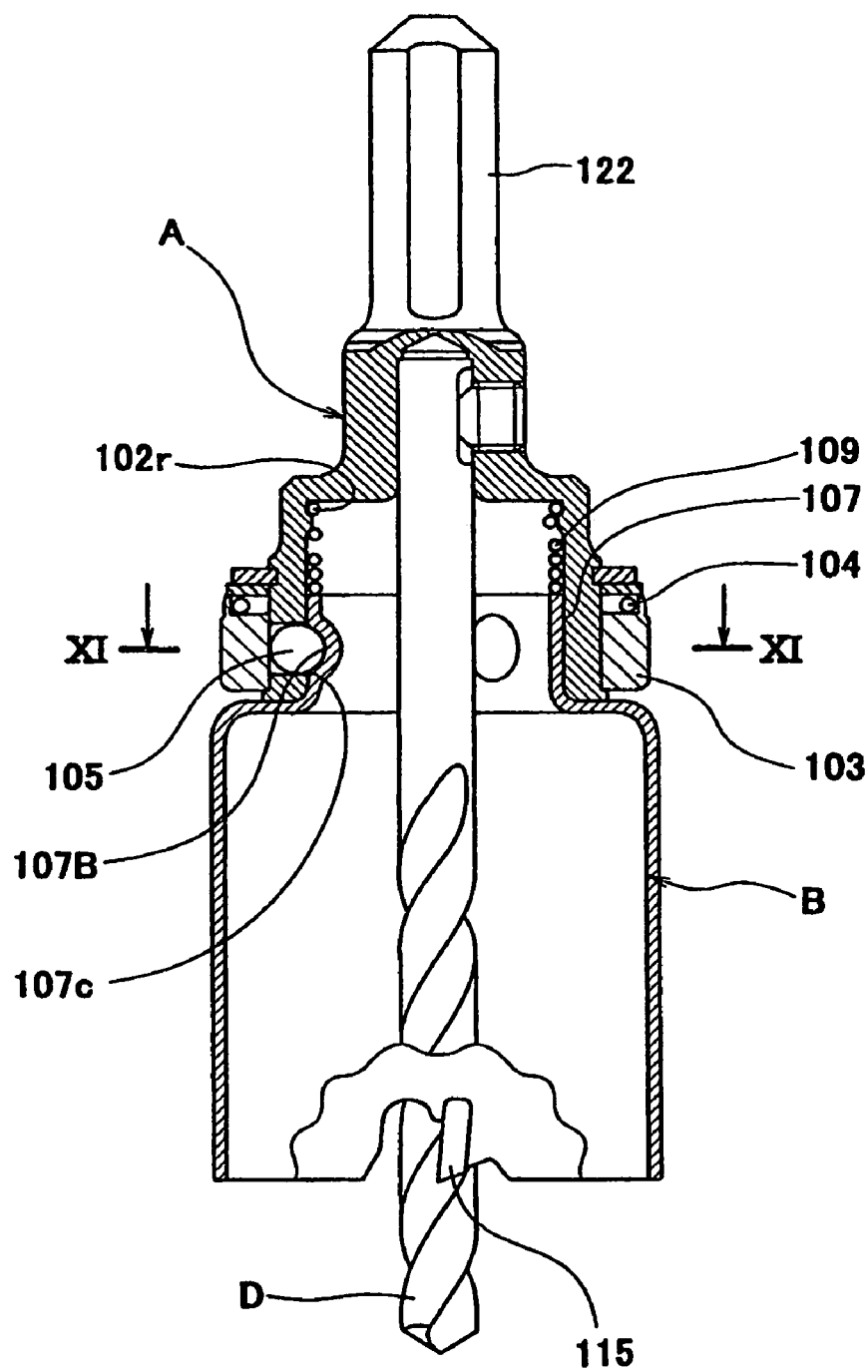
FIG. 10 is a partially sectional side elevational view showing the overall construction of a shank attaching structure according to yet another embodiment of the present invention comprising a cutter for drilling a veneer or a thin metal sheet and an arbor attaching the cutter thereto with one touch.
Figure 11:
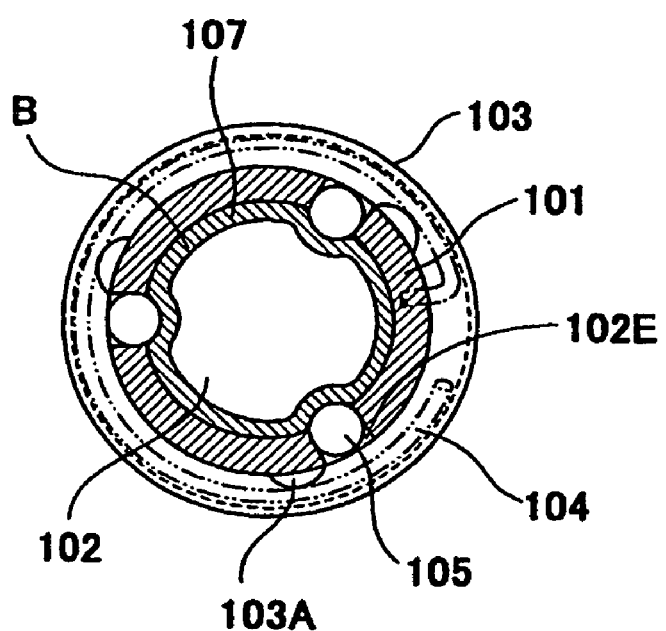
FIG. 11 is a sectional view taken on line XI—XI as viewed in the direction indicated by arrow in FIG. 10.
Figure 12:
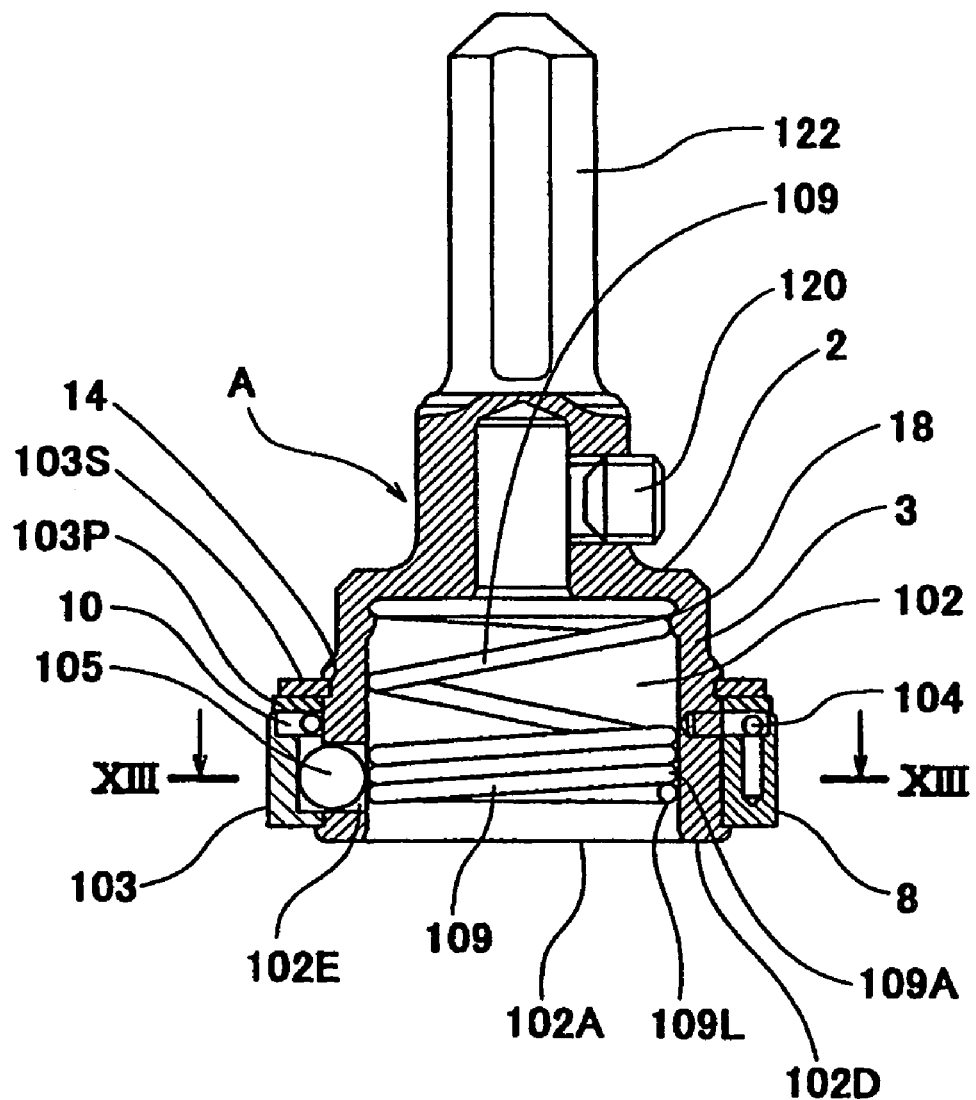
FIG. 12 is an enlarged side elevational view, partially in section, of the construction of the arbor shown in FIG. 10.
Figure 13:
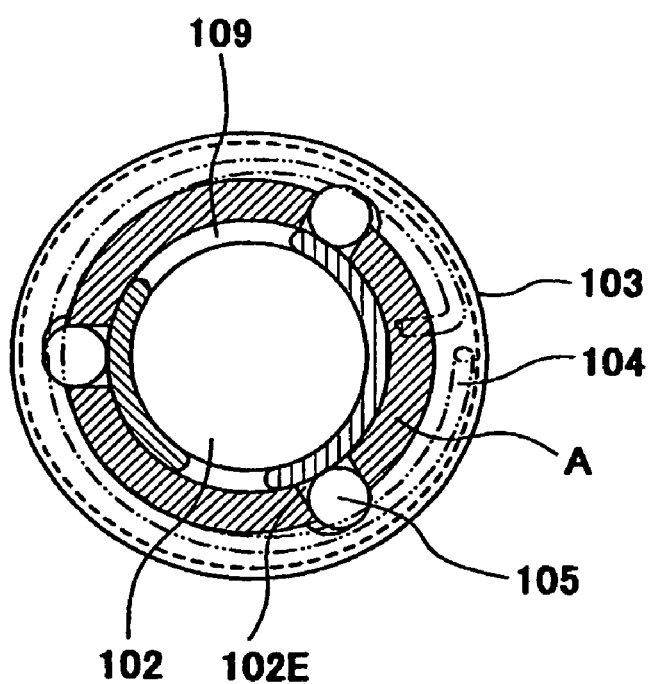
FIG. 13 is a sectional view taken on line XIII—XIII as viewed in the direction indicated by arrow in FIG. 12.

As shown in FIG. 10, in this embodiment a center drill D functioning to achieve positioning in drilling is rotatably disposed centrally of and integrally with the cutter B. The center drill D has an upper end portion 107U fitted into a base portion 101 of the arbor A and is fixed to the arbor side by means of a fixing screw 120 screwed to the arbor A from the outside toward the center of the arbor A. An abutting portion of the center drill D abutted by the tip of the fixing screw 120 is chamfered flat.

Figure 14A:
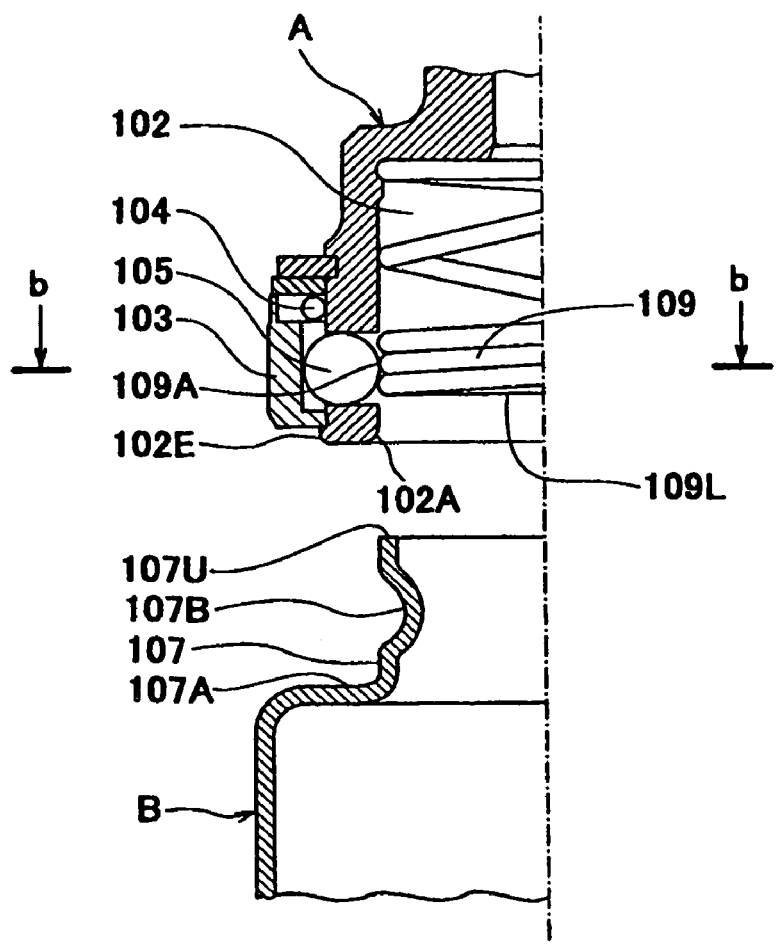
FIG. 14(*a*) is an enlarged fragmentary sectional view of the shank attaching structure shown in FIG. 10 in a state before fitting of the cutter into the shank attaching bore of the arbor.
Figure 14B:
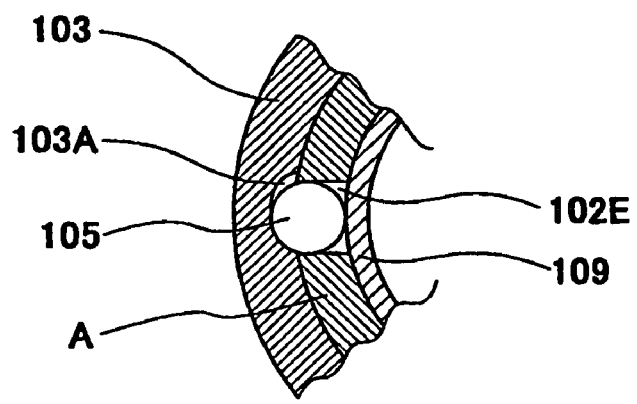
Figure 15A:
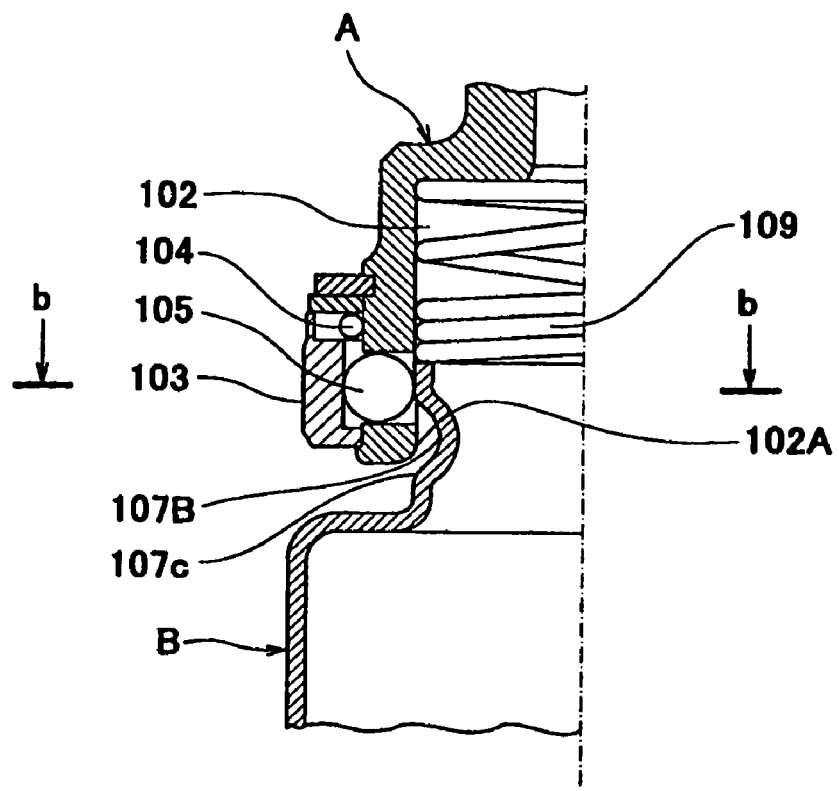
FIG. 15(*a*) is an enlarged fragmentary sectional view of the shank attaching structure shown in FIG. 10 in a state in the course of fitting of the cutter into the shank attaching bore of the arbor.
Figure 15B:
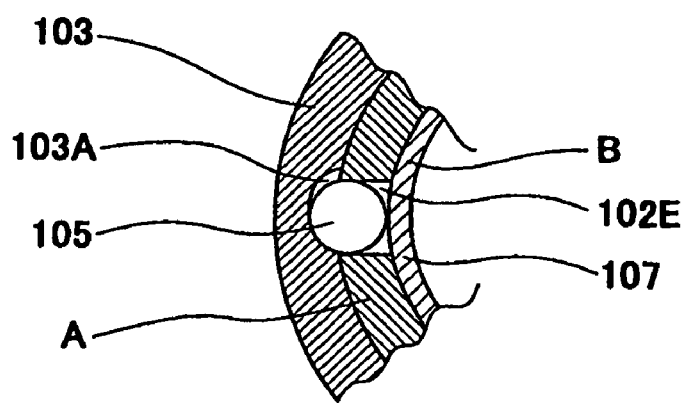
Figure 16A:
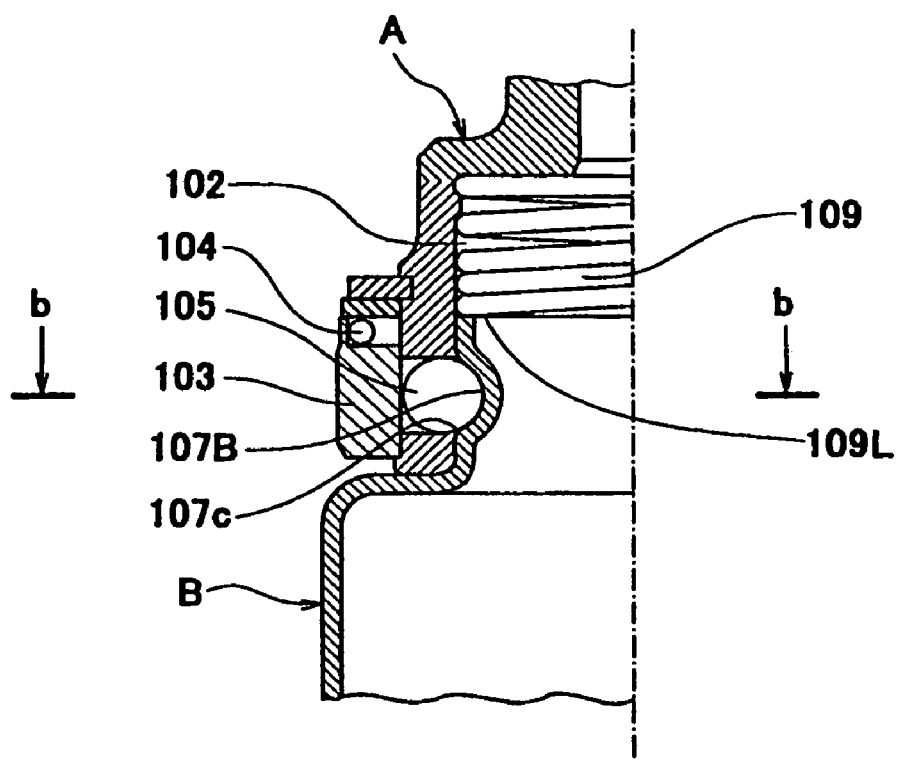
FIG. 16(*a*) is an enlarged fragmentary sectional view of the shank attaching structure shown in FIG. 10 in a state where the cutter is completely fitted into the shank attaching bore of the arbor.
Figure 16B:
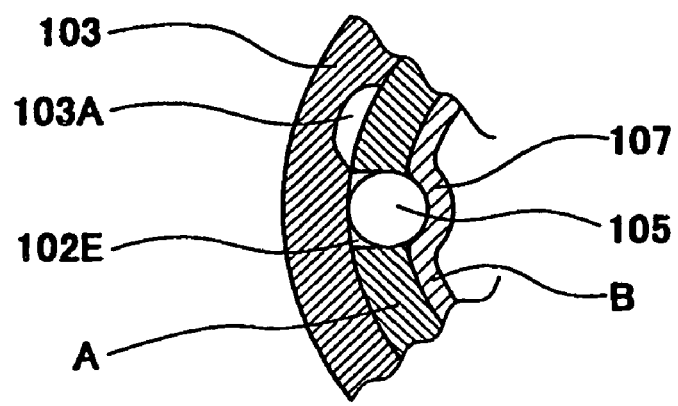

The upper end face 107U of the shank 107 of the cutter B is configured to abut the tip 109L of coil spring 109 disposed within the arbor A, so that when the cutter B is fitted into the shank attaching bore 102, the coil spring 9 contracts upwardly (toward the base end) into the state shown in FIG. 16 from the state shown in FIG. 14 through the state shown in FIG. 15 to cause each spherical body 105, which has been held as pressed radially outwardly by the tip portion 109A of the coil spring 109, to partially protrude inwardly thereby engaging respective engaging portion 107B. The spherical body 105 thus engaged is in a state pressed toward the outer periphery by the inner periphery of attachment/detachment ring 103 from the outer peripheral side as shown in FIGS. 10 and 16.

It is to be noted that reference numeral 122 designates a fitting portion to be attached to the chuck of the drill.

The embodiment thus constructed according to the fourth to sixth inventions of the present invention provides the same effects as those provided by the fourth to sixth inventions incorporated in the embodiment shown in FIGS. 1 to 9. Of course, with the shank attaching structure and the cutter according to the embodiment shown in FIGS. 10 to 16, it is also possible to attach the cutter B to the arbor A in a so-called "one touch" manner.

Further, it is needless to say that the embodiment shown in FIGS. 10 to 16 can further be provided with features embodying the first to third inventions of the present invention as required and that in such a case the embodiment is capable of additionally providing the effects of the first to third inventions as the embodiment shown in FIGS. 1 to 9.

Though each engaging portion 107B comprises a concave portion in the embodiment shown in FIGS. 10 to 16, the engaging portion 107B may comprise a through-hole instead of such a concave portion.

It is needless to say that the present invention can be practiced by variously modifying the foregoing embodiments within the scope within which a person skilled in the art would be enable to make obvious modifications without changing the basic technical concept of the present invention and that such modifications belong to the technical concept of the present invention.

INDUSTRIAL APPLICABILITY

The shank attaching structure and the cutter having the shank for use with the shank attaching structure according to the present invention can be utilized in attaching a tool such as a cutter to a drilling machine, a hand-held power drill, a hammer drill or the like.

Moreover, this shank structure is a shank attaching structure which is simple in construction, easy to work and can be assembled easily in a short time.

Thus, the shank attaching structure can be manufactured less expensively than the prior art shank attaching structure and obtain higher reliability by virtue of its simple structure. Since the shank attaching structure allows an worker to attach the cutter to the arbor side easily with one hand, it is possible to save the time required for a tool change as well as to relieve the labor of the worker.

Further, the shank attaching structure allows a chip breaking function, which is impossible with the prior art one-touch type shank attaching structure, to be performed while ensuring an accurate drilling operation without any free movement even in the radial direction.

Furthermore, the cutter according to the present invention is free from an incident that it becomes incapable of being detached from the arbor due to an impactive force if exerted in the rotational direction during a drilling operation.

What is claimed is:

1. A cutter to be attached to a shank attaching structure in which a lock member is disposed on an inner periphery of a shank attaching bore opening at a tip of an arbor so as to be radially outwardly retractable for removably fitting a shank provided at a base end of the cutter into the shank attaching bore of the arbor with one touch, characterized in that:
a base end face of the shank of the cutter is configured to abut a lower end of a supporting portion constructed of a tip portion of a coil spring, the tip portion being formed of a wire wound with a winding pitch made substantially equal to the diameter of the wire forming the coil spring so as to allow the supporting portion to press the shank of the cutter toward the open side and restrain the lock member from protruding into the shank attaching bore.

2. A cutter for use with a shank attaching structure in which a lock member is disposed on an inner periphery of a shank attaching bore opening at a tip of an arbor so as to be radially outwardly retractable and a shank provided at a base end of the cutter is formed with a concave engaging portion for engagement with the lock member disposed on the arbor side so as to be capable of being removably fitted into the shank attaching bore of the arbor quickly, characterized in that:
a concave portion forming the engaging portion has an outer peripheral edge portion which is dented from a neighboring peripheral surface of the shank.

3. The cutter according to claim 2, wherein the arrangement that the concave outer peripheral edge portion forming the engaging portion is dented from the neighboring peripheral surface of the shank is made by forming a chamfered portion at the outer peripheral edge portion.

4. The cutter according to claim 2, wherein the arrangement that the concave outer peripheral edge portion forming the engaging portion is dented from the neighboring peripheral surface of the shank is made by decreasing the diameter of a portion of the shank where the engaging portion is formed.

5. The cutter according to claim 2, wherein the arrangement that the concave outer peripheral edge portion forming the engaging portion is dented from the neighboring peripheral surface of the shank is made by cutting an outer peripheral surface of the shank in a portion where the engaging portion is located into a flat surface.

6. The cutter according to claim 2, wherein the engaging portion is a conical concave portion.

7. A shank attaching structure in which a lock member is disposed on an inner periphery of a shank attaching bore opening at a tip of an arbor so as to be radially outwardly retractable for removably fitting a shank provided at a base end of a cutter into the shank attaching bore of the arbor with one touch, characterized in that:
a supporting portion restraining the lock member from protruding into the shank attaching bore is constructed of a tip portion of a coil spring pressing the shank of the cutter toward the open side, the tip portion being formed of a wire wound with a winding pitch made substantially equal to the diameter of the wire forming the coil spring.

8. The shank attaching structure according to claim 7, wherein an inner peripheral surface of a base end portion of the shank attaching bore is formed with threadingly attaching means for thread engagement with a base end of the coil spring.

9. The shank attaching structure according to claim 7, wherein a base end of the coil spring is engaged with an engagement groove portion circumferentially contacting a base end portion of the shank attaching bore.

10. The shank attaching structure according to claim 7, wherein the wire forming the coil spring is quadrangular in section.

* * * * *